US010985896B2

(12) United States Patent
Rask et al.

(10) Patent No.: US 10,985,896 B2
(45) Date of Patent: Apr. 20, 2021

(54) METHOD AND NETWORK NODE FOR HANDLING SIGNALS TRANSMITTED FROM WIRELESS DEVICES

(71) Applicant: Telefonaktiebolaget LM Ericsson (publ), Stockholm (SE)

(72) Inventors: Patrik Rask, Sollentuna (SE); Juan-Antonio Ibanez, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 51 days.

(21) Appl. No.: 16/069,755

(22) PCT Filed: Jan. 13, 2016

(86) PCT No.: PCT/SE2016/050010
§ 371 (c)(1),
(2) Date: Jul. 12, 2018

(87) PCT Pub. No.: WO2017/123124
PCT Pub. Date: Jul. 20, 2017

(65) Prior Publication Data
US 2019/0020460 A1    Jan. 17, 2019

(51) Int. Cl.
*H04L 5/14* (2006.01)
*H04W 28/02* (2009.01)
(Continued)

(52) U.S. Cl.
CPC .............. *H04L 5/14* (2013.01); *H04L 47/41* (2013.01); *H04W 28/0273* (2013.01); *H04W 72/0446* (2013.01)

(58) Field of Classification Search
CPC ...... H04L 5/14; H04L 47/41; H04W 72/0446; H04W 28/0273
See application file for complete search history.

(56) References Cited

U.S. PATENT DOCUMENTS

2010/0195587 A1    8/2010  Ratasuk et al.
2011/0103291 A1*   5/2011  Wiberg .............. H04B 7/15542
                                                          370/315
(Continued)

FOREIGN PATENT DOCUMENTS

CA         2310545 C    *  2/2005  ........... H04B 7/2628
JP       2014-220612 A     11/2014

OTHER PUBLICATIONS

International Search Report and Written Opinion dated Sep. 7, 2016 issued in International Patent Application No. PCT/SE2016/050010. (9 pages).

*Primary Examiner* — Thai Nguyen
(74) *Attorney, Agent, or Firm* — Patent Portfolio Builders, PLLC

(57) ABSTRACT

There is disclosed a method and a network node for handling signals transmitted from one or more wireless devices in a wireless network when Time Division Duplex (TDD) is employed such that two successive uplink subframes of a radio frame are separated by an intermediary time interval. The signals are received during a subframe reserved for uplink transmissions, and a sending time interval with a length of at least a subframe is selected. Then, the received signals are sent to a transport network such that the signals are distributed over the selected sending time interval instead of being sent virtually at the same time as in conventional procedures. Thereby, the signals will be distributed over a longer time when arriving at the transport network which will have time to handle the signals properly such that any loss of packets can be avoided or at least reduced.

18 Claims, 5 Drawing Sheets

(51) Int. Cl.
*H04L 12/891* (2013.01)
*H04W 72/04* (2009.01)

(56) References Cited

U.S. PATENT DOCUMENTS

2011/0228697 A1* 9/2011 Yano .................... H04L 1/1635
370/253
2015/0006625 A1 1/2015 Lee et al.

\* cited by examiner

METHOD AND NETWORK NODE FOR HANDLING SIGNALS TRANSMITTED FROM WIRELESS DEVICES

CROSS REFERENCE TO RELATED APPLICATION(S)

This application is a 35 U.S.C. § 371 National Stage of International Patent Application No. PCT/SE2016/050010, filed Jan. 13, 2016, designating the United States.

TECHNICAL FIELD

The present disclosure relates generally to a method and a network node, for handling signals transmitted from multiple wireless devices when Time Division Duplex, TDD, is employed.

BACKGROUND

In a network for wireless communication, downlink signals are transmitted from serving nodes in the network to wireless devices and uplink signals are transmitted from the wireless devices to their serving nodes. In this communication, a Time Division Duplex, TDD, configuration may be used where the uplink and downlink signals are transmitted on the same common frequency band. In TDD, uplink and downlink signals are not transmitted at the same time to avoid interference between the uplink and the downlink. The third Generation Partnership Project, 3GPP, has defined a wireless communication technology called Long Term Evolution, LTE, where TDD can be employed. A network for wireless communication is referred to as a "wireless network" herein for short. Further, the term "wireless device" is used herein to denote any communication equipment that is capable of wireless communication with a wireless network. Some non-limiting examples of wireless device include mobile phone, smartphone, tablet, laptop computer and Machine-to-Machine, M2M, device.

Different TDD configurations have been defined for uplink and downlink transmissions in specific time intervals called subframes which are comprised in a radio frame that is repeated over time. A subframe is basically defined by a preset time period and a radio frame comprises a predefined number of consecutive subframes, e.g. 10 subframes. FIG. 1 illustrates a radio frame of 10 milliseconds comprising 10 subframes 0-9 of 1 millisecond each. A TDD subframe can also be seen as a radio resource that can be allocated for a transmission.

In TDD, each subframe is reserved for either uplink transmissions from wireless devices or downlink transmissions from nodes in the wireless network such that the uplink and downlink transmissions do not occur at the same time. In such a wireless network that employs TDD, it is possible to use different uplink-downlink, UL-DL, configurations of subframes, e.g. depending on the current need for uplink and downlink radio resources. The same UL-DL configuration is typically used in a synchronized manner over an extensive area with many cells and serving nodes, sometimes even across the entire wireless network, to avoid interference between uplink and downlink transmissions.

A set of different UL-DL configurations predefined for LTE is shown in the table of FIG. 2, including seven UL-DL configurations 0-6 each having ten subframes 0-9 comprised in a repeatable radio frame. Subframes reserved for downlink transmissions are denoted D and subframes reserved for uplink are denoted U. There are also "special" subframes denoted S which are divided into three parts including a downlink part, a guard period, and an uplink part.

TDD is useful for adapting the allocation of subframes to asymmetric traffic, i.e. when the needs for uplink and downlink transmissions are not the same. For example, if there are many users engaged in streaming services for music and movies, the downlink traffic of data will be more intense and require more radio resources than the uplink traffic which may comprise acknowledgements of correctly received data. Such traffic needs can be handled in the wireless network by selecting a UL-DL configuration with more downlink subframes than uplink subframes. In terms of asymmetry, the UL-DL configurations 0-6 range from only one uplink subframe per radio frame in UL-DL configuration 5, i.e. 10% resources available for uplink, to six uplink subframes per radio frame in UL-DL configuration 0, i.e. 60% resources available for uplink.

In some service protocols, the wireless device is required to send an acknowledgement of correctly received data that has been sent in packets to the wireless device from a data source. For example, streamed media transmitted from a data source such as a streaming server over the Transport Control Protocol, TCP, and received by the wireless device on a downlink subframe, must be acknowledged by the wireless device by sending one or more acknowledgments, denoted TCP ACKs, on an uplink subframe. The wireless network then sends the TCP ACK(s) to a transport network for further transportation to finally reach the data source, e.g. a streaming server. The wireless device is typically required to transmit a TCP ACK in an individual packet to acknowledge correct reception of one or more packets with data. A common procedure is that two data packets are acknowledged by one TCP ACK. Even though TCP is used herein as an example, it can be understood that this disclosure may also be valid for other communication protocols for data packets.

However, it is a problem that the transport network may become overloaded with signals sent from the wireless network when TDD is employed and there is a risk that some packets transmitted from one or more wireless devices, such as TCP ACKs, may be lost before reaching their respective destinations, due to the overload in the transport network. If a packet from a wireless device is lost, it may be necessary for the wireless device to retransmit the packet. Further, if the lost packet contains an acknowledgement to a server of correctly received data, e.g. two data packets, that data must be retransmitted from the server to the wireless device even though it was in fact correctly received. It can thus be understood that any lost uplink packets may result in increased consumption of radio resources in the wireless network and possibly also more delays and poorer service performance due to the above retransmissions.

SUMMARY

It is an object of embodiments described herein to address at least some of the problems and issues outlined above. It is possible to achieve this object and others by using a method and a network node as defined in the attached independent claims.

According to one aspect, a method is provided for handling signals transmitted from one or more wireless devices in a wireless network when Time Division Duplex, TDD, is employed in successive radio frames. Each radio frame comprises multiple subframes where two successive subframes reserved for uplink transmissions are separated by an intermediary time interval with one or more subframes not reserved for uplink transmissions. In this method, the signals are received during a subframe reserved for uplink transmissions, and a sending time interval with a length of at least a subframe is selected. The received signals are then sent to a transport network such that the signals are distributed over the selected sending time interval.

According to another aspect, a network node is arranged to handle signals transmitted from one or more wireless devices in a wireless network when TDD is employed in successive radio frames. As in the above method, each radio frame comprises multiple subframes where two successive subframes reserved for uplink transmissions are separated by an intermediary time interval with one or more subframes not reserved for uplink transmissions. The network node is configured to receive the signals during a subframe reserved for uplink transmissions, e.g. by means of a receiving module in the network node. The network node is configured to send the received signals to a transport network such that the signals are distributed over a sending time interval with a length of at least a subframe, e.g. by means of a sending module in the network node.

The above method and network node may be configured and implemented according to different optional embodiments to accomplish further features and benefits, to be described below.

A computer program is also provided which comprises instructions which, when executed on at least one processor, cause the at least one processor to carry out the method described above. A carrier containing the above computer program is further provided, wherein the carrier is one of an electronic signal, optical signal, radio signal, or computer readable storage medium

BRIEF DESCRIPTION OF DRAWINGS

The solution will now be described in more detail by means of exemplary embodiments and with reference to the accompanying drawings, in which.

DETAILED DESCRIPTION

Figures 1, 2:
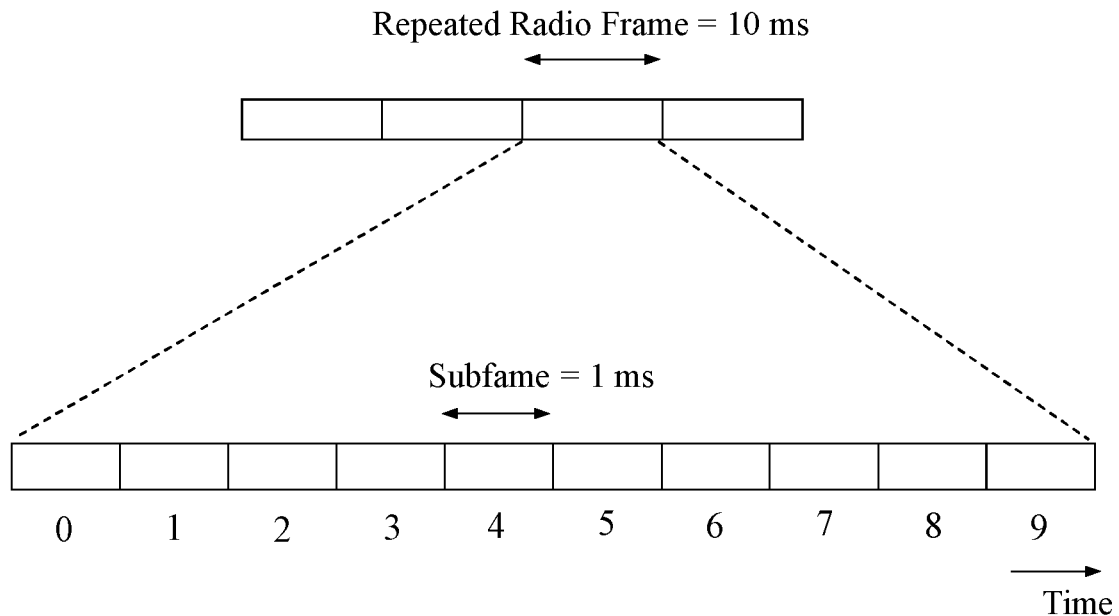
FIG. 1 is a schematic illustration of a regular radio frame comprising 10 subframes, which can be used for wireless communication.
FIG. 2 is a table with predefined UL-DL configurations which can be used when TDD is employed for wireless communication.

Briefly described, a solution is provided to avoid or at least reduce the above-mentioned overload in the transport network due to uplink transmissions of signals when TDD is employed in the wireless network. This can be achieved by selecting a sending time interval with a length of at least a subframe, and sending the received signals to a transport network such that the signals are distributed over the selected sending time interval. Thereby, it is avoided that the signals arrive at the transport network virtually at the same time, i.e. at line rate, which could otherwise cause a short-lived but unfortunate overload in the transport network. Instead, the signals will be distributed over a longer time when arriving at the transport network which means that the transport network, e.g. an aggregation point therein, will have sufficient time to handle the signals properly such that any loss of packets can be avoided or at least reduced.

In this solution, it has been recognized that usage of TDD in the wireless network entails a high concentration of signals to be sent to the transport network after each uplink subframe during which the wireless network may receive a large amount of signals from one or more wireless devices in one or more cells. Since the TDD often requires that the same UL-DL configuration is used in a synchronized manner in several cells across a relatively large area, there may be a large number of wireless devices in that area transmitting simultaneously during a single uplink subframe. It has further been recognized that above-mentioned problem of lost packets and overload in the transport network is typically caused by the virtually simultaneous arrival of signals at the transport network. By distributing these signals over time when sending them to the transport network, the above-mentioned overload situation can be avoided or at least reduced.

It will now be described in more detail how this overload situation may occur when using conventional procedures for sending signals from the wireless network to the transport network. In this description, the TCP ACKs will be used as an example of signals transmitted from a wireless device, although the description could also be correspondingly valid for any other types of signals being transmitted during a subframe.

Since the wireless device typically needs to wait for the allocation of an uplink subframe before it can transmit, it may have received a substantial amount of packets with data from the wireless network before getting the opportunity to transmit all the corresponding TCP ACKs that acknowledge correct reception, e.g. of all the data packets received since the last opportunity for uplink transmission. For example, a downlink allocation of 1 ms can be used for transmitting several data packets to a wireless device which must all be acknowledged by a corresponding number of TCP ACKs as soon as possible. As a result, the wireless network will conventionally send multiple packets with TCP ACKs virtually at the same time to the transport network. In current procedures, the wireless network thus sends all the signals received from one or more wireless devices in an uplink subframe to the transport network as fast as the physical connection thereto allows, i.e. at so-called "line rate".

Thereby, the sending of packets to the transport network becomes "bursty" by being intense momentarily, i.e. within a very short time span, and zero during the much longer time span between the uplink occasions. If an UL-DL configuration with relatively few uplink subframes is used in the wireless network, such as UL-DL configuration 2 with one uplink subframe every $5^{th}$ subframe or UL-DL configuration 5 with one uplink subframe every $10^{th}$ subframe, the burstiness in the transport network will be all the more pronounced.

Figure 3:
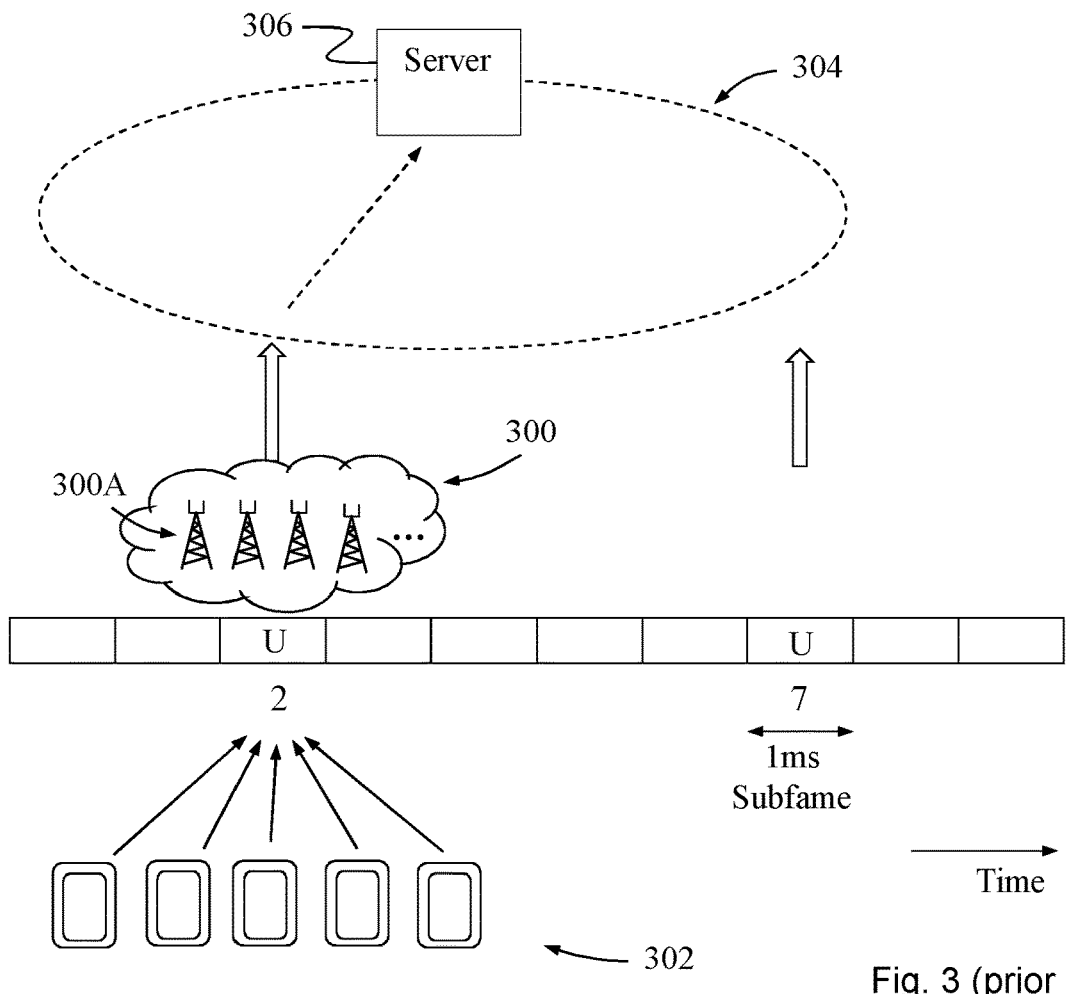
FIG. 3 is a communication scenario illustrating how uplink signals can be sent over a transport network to a server, according to prior art.

Furthermore, if several wireless devices across an extended area need to transmit their uplink signals, such as TCP ACKs, at the same time because the same uplink subframe must be used in a synchronized manner according to the UL-DL configuration currently employed by all wireless devices in the area, the transport network might be overloaded with numerous signals coming from several base stations during a very short time span. This situation is illustrated in FIG. 3 where UL-DL configuration 2 in FIG. 2 is employed, as an example, by multiple base stations 300A of wireless network 300 allowing for uplink transmissions in subframes 2 and 7 of each radio frame. It is shown that multiple wireless devices 302 transmit signals, e.g. TCP ACKs, in the uplink subframe 2 and the base stations 300A send all the signals simultaneously to the transport network 304 to finally reach a server 306 or the like. This behavior is repeated at each uplink subframe such as subframes 2 and 7 in successive radio frames.

Figure 3A:
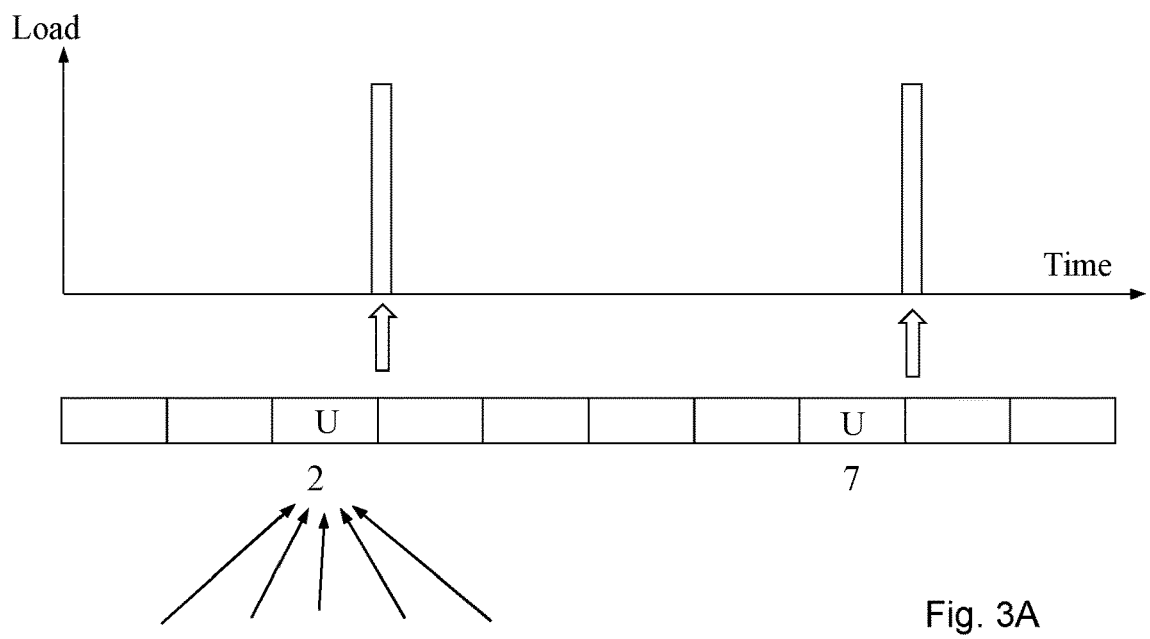
FIG. 3A is a diagram illustrating the load on a transport network as a result of the uplink signals in FIG. 3.

FIG. 3A further illustrates how the load on the transport network 304 of FIG. 3 varies over time as a result of the above transmissions in uplink subframes 2 and 7. It can be seen in this figure that there is a very short-lived but sharp peak in the load after each uplink subframe 2 and 7 due to the transmissions from the wireless devices which may be made in several different cells. This peak load will hit an aggregation point or the like in the transport network 304 which is responsible for routing signals and packets from the wireless network through the transport network 304 towards their respective destinations, e.g. the server 306. It is a problem that the transport network 304 and any aggregation point therein may not have enough capacity for handling such peak load which may result in congestion and loss of signals.

Furthermore, the high concentration of TCP ACKs reaching the server 306 due to the infrequent occasions in TDD to transmit signals in uplink, will trigger bursts of data packets from the server towards the wireless devices 302. These bursts with data are typically significantly larger in volume than the bursts of TCP ACKs, since TCP ACK packets are usually smaller in size than data packets. It is therefore a further problem that the transport network 304 and/or the wireless network 300 may not be able to handle such large bursts of data directed to the wireless devices 302, and packets may therefore be dropped before reaching their destination(s).

An example of how the solution may be employed will now be described with reference to FIG. 4 which illustrates that wireless devices 400 transmit signals in an uplink subframe 402A which signals are received by a wireless network 404, e.g. by means of one or more base stations 404A serving the wireless devices 400. In this example, UL-DL configuration 2 is used where subframes 2 and 7 are reserved for uplink transmission, like in the scenario shown in FIG. 3. In this UL-DL configuration two successive uplink subframes 402A and 402B are separated by an intermediary time interval 402C extending over four subframes 3-6 which are not reserved for uplink transmissions, see also FIG. 2. It can be seen in FIG. 2 that in all UL-DL configurations 0-6, two successive uplink subframes, either within a single radio frame or across two successive radio frames such as in UL-DL configuration 5, are separated by an intermediary time interval 402C comprising one or more subframes not reserved for uplink transmissions.

The signals received in the uplink subframe 402A are then sent from the wireless network 404 to a transport network 406 such that the signals are distributed over a sending time interval 408 having a length of at least a subframe. The sending time interval 408 may have any length between a subframe and the intermediary time interval 402C plus one subframe. It may be preferable to finish the sending of signals received in one uplink subframe before the next uplink subframe has occurred. This procedure may be repeated after each uplink subframe 402A, 402B in successive radio frames.

The signals may be sent from the wireless network 404 to an aggregation point 410 in the transport network 406 and the aggregation point 410 may then perform a forwarding operation so that the received signals can reach their respective destinations which may include a server 412 or the like. For example, the server 412 may have sent data packets to one or more of the wireless devices 400 and the signals received therefrom in uplink subframe 402A may comprise acknowledgements of correct reception of the respective data packets, such as TCP ACKs, in the manner described above. Further, the signals may be sent to the transport network 406 by the one or more base stations 404A or by a network node 404B which is connected to the one or more base stations 404A.

An example of how the solution may be employed in terms of actions performed in a wireless network, e.g. by a network node therein, for handling signals transmitted from one or more wireless devices in a wireless network when TDD is employed in successive radio frames, will now be described with reference to the flow chart in FIG. 5. Reference will also be made, without limiting the features described, to the example shown in FIG. 4. In this procedure it is assumed that each radio frame comprises multiple subframes where two successive subframes reserved for uplink transmissions, such as subframes 402A, 402B, are separated by an intermediary time interval with one or more subframes not reserved for uplink transmissions, such as the intermediary time interval 402C.

Figure 5:
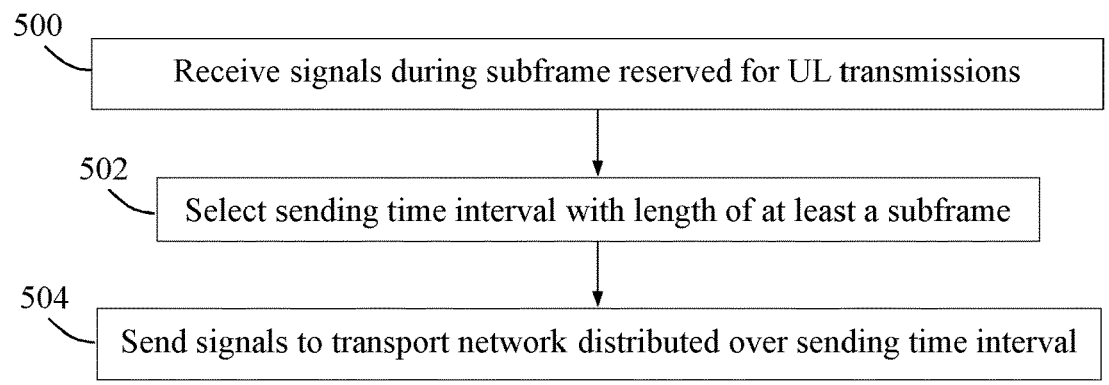
FIG. 5 is a flow chart illustrating a procedure for handling signals transmitted from multiple wireless devices when TDD is employed, according to further possible embodiments.

The procedure illustrated by FIG. 5 can thus be used to accomplish the functionality described above. The actions in this procedure may be performed as follows by a "network node" in the wireless network 404 which entity can be seen as a logic entity either implemented in the base stations 404A or in an entity, such as the network node 404B, being connected to the base stations 404A.

Figure 4:
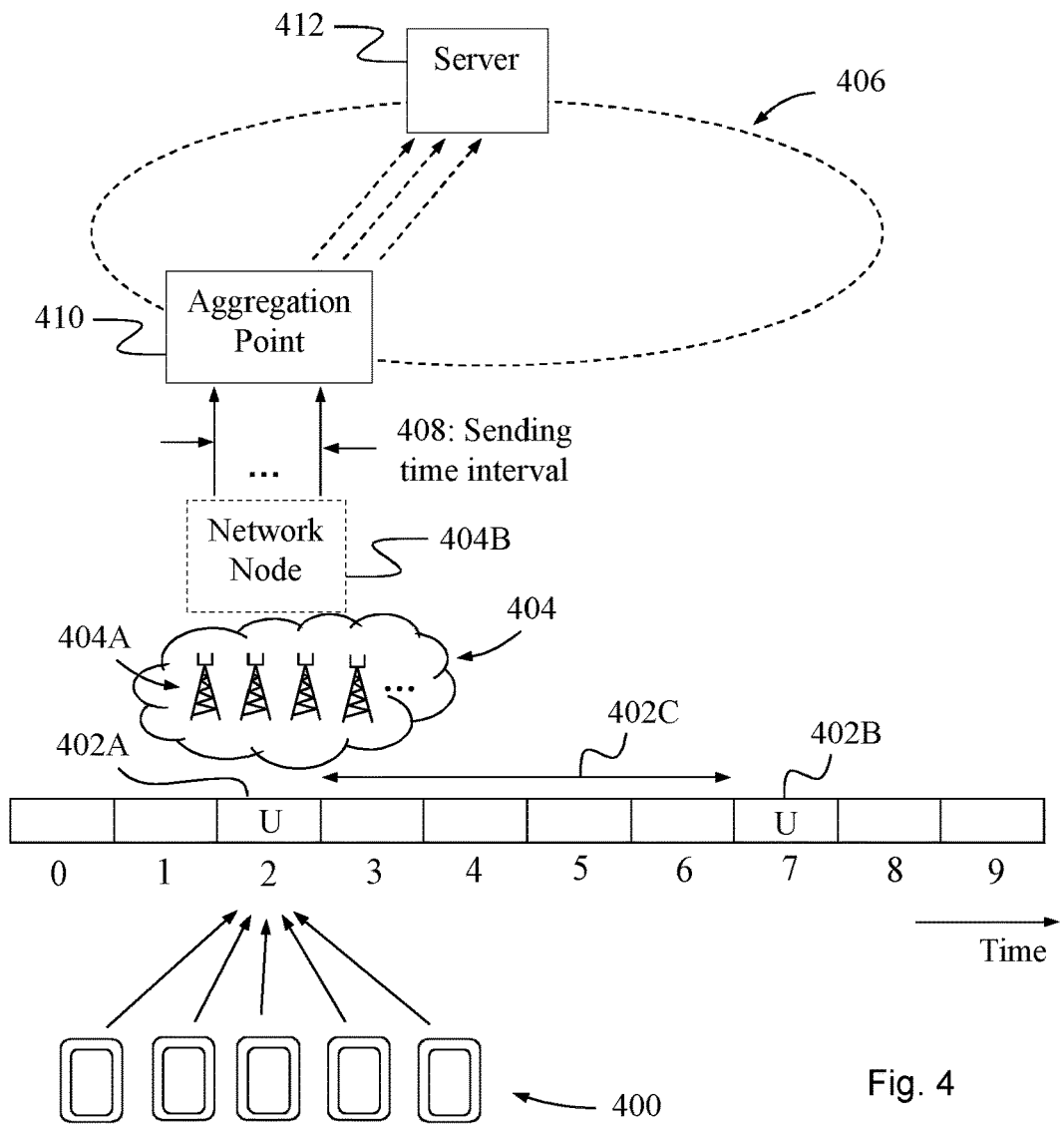
FIG. 4 is a communication scenario illustrating an example of how the solution may be employed, according to some possible embodiments.

A first action 500 illustrates that the signals are received in the wireless network during a subframe reserved for uplink transmissions, in FIG. 4 the subframe 402A. For example, the signals may have been transmitted by one or more wireless devices and they may be received by one or more base stations serving the wireless device(s). Furthermore, the signals may be received in one or more data streams. In a further action 502, a sending time interval with a length of at least a subframe, is selected. Some examples of how the sending time interval may be selected will be described later below. In a following action 504, the received signals are sent to a transport network such that the signals are distributed over the selected sending time interval. Thereby, the above-described peak in load on the transport network can be avoided or at least reduced, as compared to conventional procedures for sending signals at line rate to a transport network when TDD is used, which has been explained above.

Some non-limiting example embodiments that can be used in the above procedure, will now be described. In one possible embodiment, the sending time interval selected in action 502 may have a length within the intermediary time interval. It should be noted that the term "length" used in this disclosure indicates a duration, or time span. According to this embodiment, the length of the sending time interval can be anything between one subframe and the full intermediary time interval between the two successive subframes reserved for uplink transmissions which is dependent on which UL-DL configuration is used. For example, the intermediary time interval in UL-DL configuration 2 is four subframes while in UL-DL configuration 5 it is nine subframes spanning across two radio frames.

In another alternative possible embodiment, the sending time interval may have a length of the intermediary time interval, e.g. 402C in FIG. 4, plus one subsequent subframe, e.g. 402B in FIG. 4. This embodiment may be used when it is desirable to distribute the signals as much as possible over time before reception of further signals in the next uplink subframe has been completed and it is time to start sending the next batch of signals to the transport network.

Figure 6:
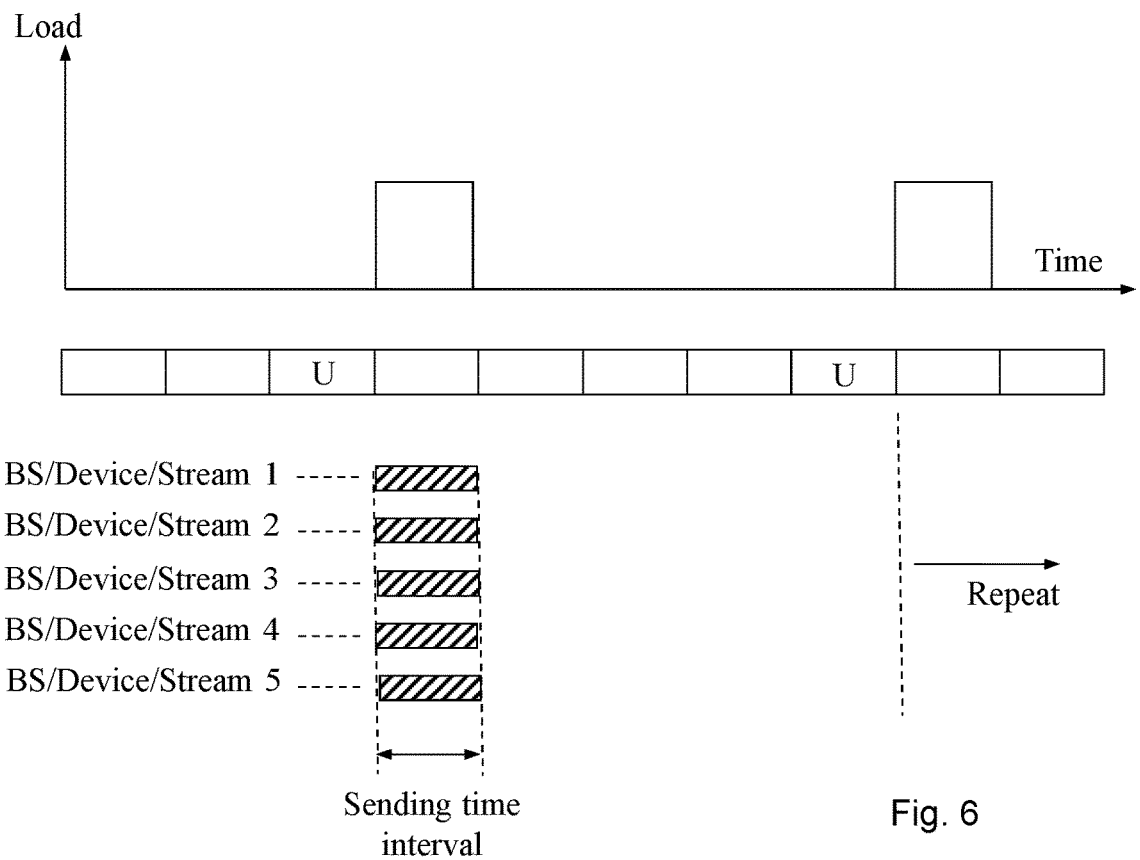
FIGS. 6-8 illustrate some examples of how the solution may be implemented in practice and the resulting load on a transport network, according to further possible embodiments.
Figure 7:
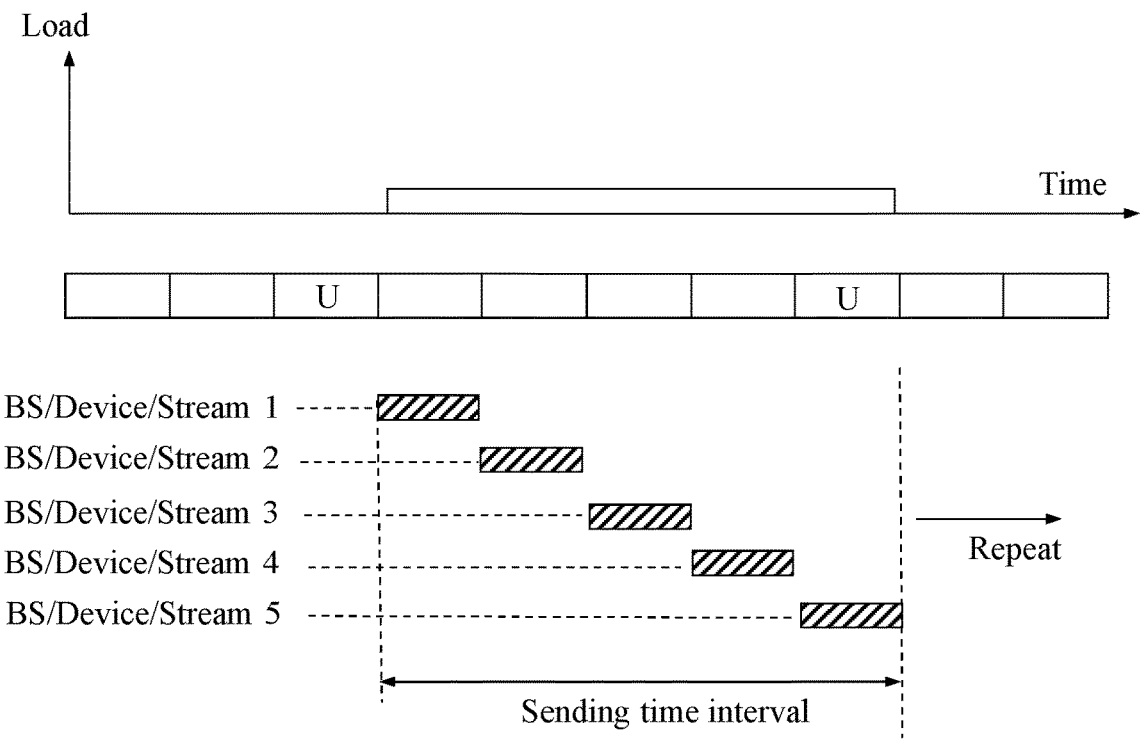
Figure 8:
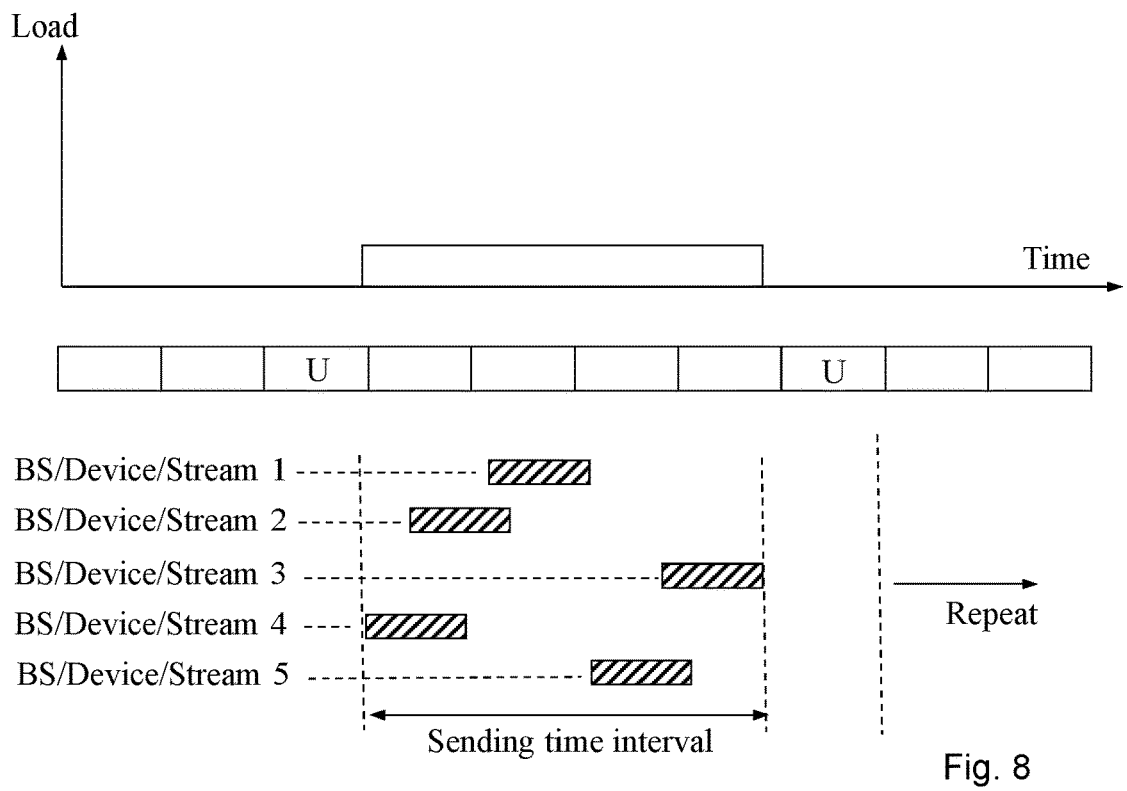

The timing of sending the different signals to the transport network within the selected sending time interval may further be chosen in different ways and some simplified but illustrative examples are shown in FIGS. 6-8 where the timing of sending the signals is represented by striped areas in relation to an UL-DL configuration. Further, each striped area 1-5 represents the sending of signals either transmitted by a particular wireless device, or received by a particular base station, BS, which may comprise signals transmitted by one or more wireless device being served by that base station, or received in a particular data stream. Hence the notation "BS/device/stream". In these examples the UL-DL configuration 2 in FIG. 2 is used, although it can be understood that the principles described herein are also applicable for any other UL-DL configurations. For simplicity, the striped areas have the same length implying that all signals are sent to the transport network with the same duration. However, different durations may be used for sending different signals to the transport network and the solution is not limited in this respect.

In one possible embodiment, at least some of the received signals may be sent to the transport network 406 simultaneously. FIG. 6 illustrates an example of how this embodiment may be realized where the sending time interval is selected to have a length of a subframe. Moreover, all signals 1-5 are sent in parallel with a duration of a subframe more or less immediately after the signals have been received in the first uplink subframe in this UL-DL configuration. It is also shown in FIG. 6 how the resulting load on the transport network 304 is distributed over time, in contrast to the short-lived high peak load shown in FIG. 3A. Alternatively, the duration of sending each signal may be extended over a sending time interval of more than one subframe, e.g. over the intermediary time interval between the two uplink subframes or over the intermediary time interval plus one subframe, which would reduce the instant load further by distributing the total load further over time.

In another possible embodiment, at least some of the received signals may be sent to the transport network 406 at different time positions within the sending time interval. Different time positions means that the sending starts at different times for the different signals. FIG. 7 illustrates an example of how this embodiment may be realized where the sending time interval is selected to have a length of the intermediary time interval plus one subframe. Moreover, the sending of signal 1 starts more or less immediately after the first uplink subframe, the sending of the next signal 2 starts after another subframe, and so forth, until all signals 1-5 have been sent in succession, one by one, across the sending time interval. In the example of FIG. 7, the received signals may be sent also in the next subframe reserved for uplink, i.e. the signals from BS/device/stream 5. It is also shown in FIG. 7 how the resulting load on the transport network 304 is distributed over time even more than in the example of FIG. 6 by extending across the intermediary time interval plus the next uplink subframe.

It should be noted that the examples of FIGS. 6 and 7 could be combined such that two or more of the signals are sent simultaneously while the other signals are sent at other time positions within the sending time interval. In another possible embodiment, the sending of each received signal to the transport network may start at a randomly selected time within the sending time interval. Thereby, the signals are likely to be distributed evenly across the sending time interval without requiring any logic for choosing the time to start sending the signals.

In another possible embodiment, at least some of the received signals may be partly overlapping in time when sent to the transport network 406. FIG. 8 illustrates an example of how this embodiment, and possibly also the foregoing embodiment, may be realized where the sending time interval is selected to extend roughly across the full intermediary time interval between the two successive uplink subframes. In this example, the timing of sending signals 1-5 to the transport network 406 is chosen such that the sending of signal 2 starts before the sending of signal 4 is completed, the sending of signal 1 starts before the sending of signal 2 is completed, and the sending of signal 3 starts before the sending of signal 5 is completed. As a result, signals 1, 2 and 4 are partly overlapping and signals 3 and 5 are partly overlapping, when sent to the transport network 406, as shown in the figure. As indicated above, the timing of sending the signals in FIG. 8 may have been chosen randomly. It is also shown in this figure how the resulting load on the transport network 304 is distributed over time.

In further possible embodiments, the received signals may be sent to the transport network 406 in different groups of signals, where each group of signals contains signals transmitted from at least one specific wireless device or signals received by at least one specific base station or signals received in at least one specific data stream. It was mentioned above that the striped areas 1-5 in FIGS. 6-8 may represent the sending of signals transmitted by a particular wireless device, or received by a particular base station, or received in a particular data stream. The striped areas 1-5 in FIGS. 6-8 may thus represent examples of the above-mentioned groups of signals. Another possible embodiment could then be that each group of signals may be sent to the transport network 406 at a fixed time position within the sending time interval in each successive radio frame. Thereby, it can be avoided that jitter is introduced in the data flow between a wireless device 400 and a server 412, which could otherwise be harmful to the quality of experience of the service.

In another possible embodiment, the signals received in the wireless network 404 may be sent to an aggregation point 410 in the transport network 406. The aggregation point 410 may be responsible for routing the signals from the wireless network through the transport network 406 towards their respective destinations, e.g. a server 412.

In another possible embodiment, the received signals may comprise packets with an acknowledgement of correct reception of data, such as TCP ACKs as described above. In another possible embodiment, the signals may be received by multiple base stations 402 serving the one or more wireless devices 400. In that case, another possible embodiment could be that the above-described procedure of FIG. 5 may be performed by the multiple base stations 402 or by a network node 404 connected to the base stations 402. In further possible embodiments, the method is performed only for signals related to a certain type of service or protocol or for signals of a predefined size range.

Various examples of how the sending time interval may be selected have been outlined above which may be done based on different factors and conditions e.g. related to activities in the one or more wireless devices 400. In this respect, some possible embodiments include that the sending time interval 408 may be selected dependent of at least one of: the amount of received signals, a currently used uplink-downlink configuration, type of service used by the one or more wireless devices 400, and type of protocol used by the one or more wireless devices 400.

Figure 9:
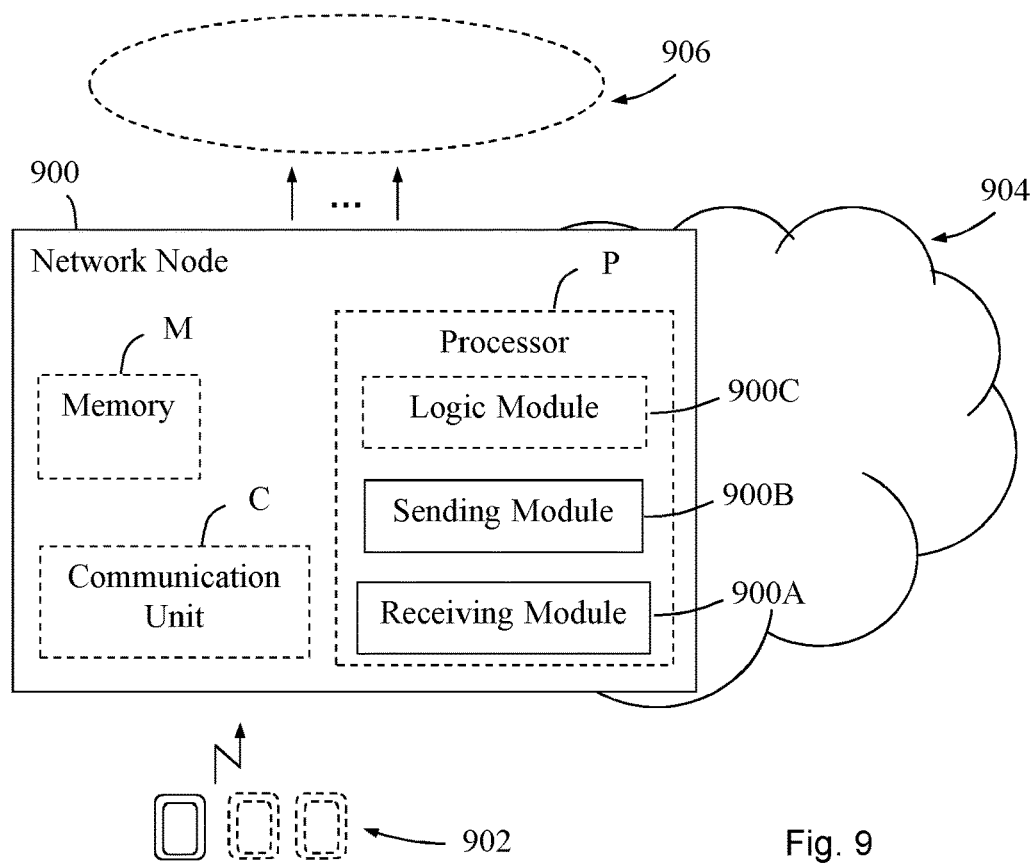
FIG. 9 is a block diagram illustrating a network node in more detail, according to further possible embodiments.

It was mentioned above that the procedure illustrated in FIG. 5 and embodiments thereof, may be performed by a network node in the wireless network which may be either implemented in one or more base stations which receive the signals transmitted from the one or more wireless devices, or in an entity connected to the base station(s). The block diagram in FIG. 9 illustrates a detailed but non-limiting example of how a network node 900 may be structured to bring about the above-described described solution and embodiments thereof.

The network node 900 may thus be configured to operate according to any of the above-described examples and embodiments. The network node 900 is shown to comprise a processor P and a memory M, the memory M comprising instructions executable by said processor P whereby the network node 900 is operative as described herein. The network node 900 also comprises a communication unit C representing suitable equipment for receiving and sending signals in the manner described herein. The communication unit C is configured for radio communication with wireless devices 902 over suitable radio interfaces using a suitable protocol for radio communication depending on the implementation. The solution and embodiments herein are thus not limited to using any specific types of networks, technology or protocols for radio communication.

The network node 900 comprises means configured or arranged to perform at least some of the actions 500-504 of the flow chart in FIG. 5. The network node 900 is arranged to handle signals transmitted from one or more wireless devices 902 in a wireless network 904 when TDD is employed in successive radio frames, each radio frame comprising multiple subframes where two successive subframes reserved for uplink transmissions are separated by an intermediary time interval with one or more subframes not reserved for uplink transmissions.

The network node 900 is configured to receive the signals during a subframe reserved for uplink transmissions. This operation may be performed by a receiving module 900A in the network node 900, e.g. in the manner described for action 500 above. The network node 900 is also configured to send the received signals to a transport network 906 such that the signals are distributed over a sending time interval with a length of at least a subframe. This operation may be performed by a sending module 900B in the network node 900, e.g. in the manner described for action 504 above.

The network node 900 may further be configured to select the sending time interval with a length of at least a subframe. This operation may be performed by a logic module 900C in the network node 900, e.g. in the manner described for action 502 above. Alternatively, the sending time interval may be selected by another node or entity, not shown, which may then instruct the network node 900 to distribute the signals over the selected sending time interval when sending the signals to the transport network 906.

It should be noted that FIG. 9 illustrates various functional units in the network node 900, and the skilled person is able to implement these functional units in practice using suitable software and hardware. Thus, the solution is generally not limited to the shown structures of the network node 900, and the functional units 900A-C therein may be configured to operate according to any of the features and embodiments described in this disclosure, where appropriate.

The functional units 900A-C described above could be implemented in the network node 900 by means of suitable hardware and program modules of a computer program comprising code means which, when run by the processor P, causes the network node 900 to perform at least some of the above-described actions and procedures. The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes.

Each computer program may be carried by a computer program product in the network node 900 in the form of a memory having a computer readable medium and being connected to the processor P. The computer program product or memory in the network node 900 may thus comprise a computer readable medium on which the computer program is stored e.g. in the form of computer program modules or the like. For example, the memory may be a flash memory, a Random-Access Memory (RAM), a Read-Only Memory (ROM), an Electrically Erasable Programmable ROM (EEPROM) or hard drive storage (HDD), and the program modules could in alternative embodiments be distributed on different computer program products in the form of memories within the network node 900.

The solution described herein may thus be implemented in the network node 900 by means of a computer program comprising instructions which, when executed on at least one processor, cause the at least one processor to carry out the actions according to any of the above features and embodiments, where appropriate. A carrier containing the above computer program may also be used when implementing the solution, wherein the carrier is one of an electronic signal, optical signal, radio signal, or computer readable storage medium.

While the solution has been described with reference to specific exemplifying embodiments, the description is generally only intended to illustrate the inventive concept and should not be taken as limiting the scope of the solution. For example, the terms "wireless device", "wireless network", "transport network", "network node", "sending time interval" and "aggregation point" have been used throughout this disclosure, although any other corresponding entities, functions, and/or parameters could also be used having the features and characteristics described here. The solution is defined by the appended claims.

The invention claimed is:

1. A method performed by a network node for handling signals received from one or more wireless devices in a wireless network when Time Division Duplex (TDD) is employed in successive radio frames, each radio frame comprising multiple subframes where two successive subframes reserved for uplink transmissions are separated by an intermediary time interval with one or more subframes not reserved for the uplink transmissions, the method comprising:
receiving the signals, from the one or more wireless devices, during a subframe of the two successive subframes reserved for the uplink transmissions,
selecting a sending time interval, wherein the sending time interval has a length of the intermediary time interval plus one subsequent subframe, and
sending the received signals to a transport network, wherein the received signals are distributed over the selected sending time interval.

2. The method of claim 1, wherein the sending comprises one of:
sending each received signal to the transport network at a randomly selected time within the sending time interval,
sending at least some of the received signals to the transport network at different time positions within the sending time interval,
sending at least some of the received signals to the transport network simultaneously, and
sending at least some of the received signals partly overlapping in time to the transport network.

3. The method of claim 1, wherein the sending comprises sending the received signals to the transport network in different groups of signals, wherein each group of signals contains signals transmitted from at least one specific wireless device or signals received by at least one specific base station or signals received in at least one specific data stream.

4. The method of claim 3, wherein the sending comprises sending said each group of signals to the transport network at a fixed time position within the sending time interval in each successive radio frame.

5. The method of claim 1, wherein the sending comprises sending the received signals to an aggregation point in the transport network.

6. The method of claim 1, wherein the received signals comprise packets with an acknowledgement of correct reception of data.

7. The method of claim 1, wherein the network node is connected to multiple base stations serving the one or more wireless devices.

8. The method of claim 1, wherein the method is performed only for signals related to a certain type of service or protocol or for signals of a predefined size range.

9. The method of claim 1, wherein the sending time interval is selected dependent on at least one of: amount of received signals, a currently used uplink-downlink configuration, a type of service used by the one or more wireless devices, and a type of protocol used by the one or more wireless devices.

10. A network node arranged to handle signals received from one or more wireless devices in a wireless network when Time Division Duplex (TDD) is employed in successive radio frames, each radio frame comprising multiple subframes where two successive subframes reserved for uplink transmissions are separated by an intermediary time interval with one or more subframes not reserved for the uplink transmissions, wherein the network node is configured to:
receive the signals, from the one or more wireless devices, during a subframe of the two successive subframes reserved for the uplink transmissions, and
send the received signals to a transport network, wherein the received signals are distributed over a sending time interval, wherein the sending time interval has a length of the intermediary time interval plus one subsequent subframe.

11. The network node of claim 10, wherein the network node is configured to:
send each received signal to the transport network at a randomly selected time within the sending time interval,
send at least some of the received signals to the transport network at different time positions within the sending time interval,
send at least some of the received signals to the transport network simultaneously, or
send at least some of the received signals partly overlapping in time to the transport network.

12. The network node of claim 10, wherein:
the network node is configured to send the received signals to the transport network in different groups of signals, wherein each group of signals contains signals transmitted from at least one specific wireless device or signals received by at least one specific base station or signals received in at least one specific data stream, and
the network node is configured to send said each group of signals to the transport network at a fixed time position within the sending time interval in each successive radio frame.

13. The network node of claim 10, wherein the network node is configured to send the received signals to an aggregation point in the transport network.

14. The network node of claim 10, wherein the received signals comprise packets with an acknowledgement of correct reception of data.

15. The network node of claim 10, wherein
the network node is connected to multiple base stations serving the one or more wireless devices.

16. The network node of claim 10, wherein the network node is configured to send the received signals distributed over the sending time interval to the transport network only when the signals are related to a certain type of service or protocol, or when the signals have a predefined size range.

17. The network node of claim 10, wherein the network node is configured to select the sending time interval dependent on at least one of: amount of received signals, a currently used uplink-downlink configuration, a type of service used by the one or more wireless devices, and a type of protocol used by the one or more wireless devices.

18. A computer program product comprising a non-transitory computer readable medium storing a computer program comprising instructions which, when executed on at least one processor, cause the at least one processor to carry out the method of claim 1.

* * * * *